United States Patent
Mannava et al.

(10) Patent No.: US 11,159,636 B2
(45) Date of Patent: Oct. 26, 2021

(54) FORWARDING RESPONSES TO SNOOP REQUESTS

(71) Applicant: ARM Limited, Cambridge (GB)

(72) Inventors: Phanindra Kumar Mannava, Austin, TX (US); Bruce James Mathewson, Papworth Everard (GB); Jamshed Jalal, Austin, TX (US); Klas Magnus Bruce, Leander, TX (US)

(73) Assignee: ARM LIMITED, Cambridge (GB)

( * ) Notice: Subject to any disclaimer, the term of this patent is extended or adjusted under 35 U.S.C. 154(b) by 533 days.

(21) Appl. No.: 15/427,384

(22) Filed: Feb. 8, 2017

(65) Prior Publication Data

US 2018/0227382 A1  Aug. 9, 2018

(51) Int. Cl.
*H04L 29/08* (2006.01)
*G06F 12/0831* (2016.01)

(52) U.S. Cl.
CPC ...... *H04L 67/2814* (2013.01); *G06F 12/0831* (2013.01); *H04L 67/10* (2013.01); *H04L 67/2842* (2013.01); *G06F 2212/621* (2013.01)

(58) Field of Classification Search
CPC . H04L 67/2814; H04L 67/10; H04L 67/2842; G06F 12/0831; G06F 2212/621
See application file for complete search history.

(56) References Cited

U.S. PATENT DOCUMENTS

| | | | |
|---|---|---|---|
| 6,275,905 B1 | 8/2001 | Keller et al. | |
| 6,370,621 B1 | 4/2002 | Keller | |
| 6,393,529 B1 | 5/2002 | Keller | |
| 6,490,661 B1 * | 12/2002 | Keller | G06F 12/0813 711/130 |
| 9,058,272 B1 * | 6/2015 | O'Bleness | G06F 12/0831 |
| 2004/0088492 A1 * | 5/2004 | Glasco | G06F 12/0817 711/141 |
| 2005/0160132 A1 * | 7/2005 | Van Doren | G06F 12/0831 709/200 |
| 2009/0113139 A1 * | 4/2009 | Pudipeddi | G06F 12/0817 711/146 |

(Continued)

FOREIGN PATENT DOCUMENTS

| | | |
|---|---|---|
| WO | 00/38069 | 6/2000 |
| WO | 2011/041095 | 4/2011 |

OTHER PUBLICATIONS

Combined Search and Examination Report dated Jul. 19, 2018 in GB Application No. 1800876.3, 9 pages.

(Continued)

*Primary Examiner* — Umar Cheema
*Assistant Examiner* — James Ross Hollister
(74) *Attorney, Agent, or Firm* — Nixon & Vanderhye, P.C.

(57) ABSTRACT

A data processing apparatus is provided, which includes receiving circuitry to receive a snoop request in respect of requested data on behalf of a requesting node. The snoop request includes an indication as to whether forwarding is to occur. Transmitting circuitry transmits a response to the snoop request and cache circuitry caches at least one data value. When forwarding is to occur and the at least one data value includes the requested data, the response includes the requested data and the transmitting circuitry transmits the response to the requesting node.

15 Claims, 6 Drawing Sheets

(56) References Cited

U.S. PATENT DOCUMENTS

| | | | |
|---|---|---|---|
| 2010/0064108 A1* | 3/2010 | Harris | G06F 12/0831 711/146 |
| 2011/0202726 A1* | 8/2011 | Laycock | G06F 12/0815 711/122 |
| 2013/0024629 A1* | 1/2013 | Flanders | G06F 12/0831 711/146 |
| 2013/0219129 A1* | 8/2013 | Rajagopalan | G06F 12/0833 711/146 |
| 2014/0032853 A1* | 1/2014 | Lih | G06F 12/0815 711/141 |
| 2015/0012713 A1* | 1/2015 | Flanders | G06F 12/0831 711/146 |
| 2017/0024320 A1* | 1/2017 | Forrest | G06F 12/0815 |
| 2018/0081808 A1* | 3/2018 | Geetha | G06F 12/084 |

OTHER PUBLICATIONS

Office Action dated May 7, 2020 in GB Application No. 1800876.3 (2 pages).
Office Action issued in GB Application No. 1800876.3 dated Sep. 21, 2020, 4 pages.
Office Action issued in Taiwan Application No. 107103406, dated May 21, 2021, with English translation, total 18 pages.

* cited by examiner

FORWARDING RESPONSES TO SNOOP REQUESTS

TECHNICAL FIELD

The present disclosure relates to data processing. More particularly, it relates to caching.

DESCRIPTION

In a multiprocessor system, there may be a number of nodes or processors, each with their own cache(s). These nodes may be connected to one or more shared caches or memories. A particular data value can therefore be located in one of the shared caches or memories or in a local cache of one of the processors. When a node wishes to access a data value, therefore, it is sometimes necessary to obtain the data from another node. This is achieved by the requester sending a request to a so-called home node, which maintains coherency of the data throughout the system. The home node then issues one or more snoop requests to nodes that potentially have the requested data. If one of those nodes has the data, they may return it to the home node, which returns the data to the requester. This process, however, involves the exchange of several communications, which can take time to resolve.

SUMMARY

Viewed from a first example configuration, there is provided a data processing apparatus comprising: receiving circuitry to receive a snoop request in respect of requested data on behalf of a requesting node, said snoop request comprising an indication as to whether forwarding is to occur; transmitting circuitry to transmit a response to said snoop request; and cache circuitry to cache at least one data value, wherein when forwarding is to occur and said at least one data value comprises said requested data, said response comprises said requested data and said transmitting circuitry transmits said response to said requesting node.

Viewed from a second example configuration, there is provided a data processing apparatus comprising: receiving circuitry to receive a data request from a requesting node in respect of requested data; and transmitting circuitry to transmit a snoop request to an other node, wherein said snoop request comprises an identifier of said requesting node, a reference to said requested data, and an indication of whether forwarding is to occur directly from said other node to said requesting node when said requested data is cached at said other node.

Viewed from a third example configuration, there is provided a data processing method comprising: caching at least one data value; receiving a snoop request in respect of requested data on behalf of a requesting node, said snoop request comprising an indication as to whether forwarding is to occur; and transmitting a response to said snoop request, wherein when forwarding is to occur and said at least one data value comprises said requested data, said response comprises said requested data and said response is transmitted to said requesting node.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: receiving circuitry to receive a snoop request in respect of requested data on behalf of a requesting node, said snoop request comprising an indication as to whether forwarding is to occur; transmitting circuitry to transmit a response to said snoop request; and cache circuitry to cache at least one data value, wherein when forwarding is to occur and said at least one data value comprises said requested data, said response comprises said requested data and said transmitting circuitry transmits said response to said requesting node.

In accordance with the above the snoop request itself includes an indication of whether a forwarding process is to occur. This could either be an indication that forwarding is to occur (if the default is not to perform forwarding) or an indication that forwarding is not to occur (if the default is to perform forwarding). When forwarding occurs, the data processing apparatus (which may be another master/requesting node and is also referred to in this description as a responding node) directly forwards the requested data, if it is present, to the requesting node that issued the request for the data. Consequently, if the data is available at the responding node, there is no need for the data to be transmitted back to the home node and onward from the home node to the requesting node. This therefore makes it possible to reduce a latency involved when a requesting node issues a request for data that is held by the responding node. The snoop request is generated by a home node in response to the requesting node requesting access to the data. The home node may generate the snoop request in order to determine whether the data is held by another node (such as the responding node) within the system. Accessing the data from the responding node can be quicker than accessing the data via a main system memory, for example.

In some embodiments said snoop request is received from a home node; and when forwarding is inhibited from occurring, said response comprises said requested data and said transmitting circuitry transmits said response to said home node. When forwarding is not to occur (either by default or by indication), rather than forwarding a response to the requesting node, the responding node sends the response to the home node.

In some embodiments, said snoop request is received from a home node; and when forwarding is to occur and said at least one data value comprises said requested data, said transmitting circuitry additionally transmits a completion notification to said home node to indicate that said snoop request has been fulfilled. As well as transmitting the response to the requesting node, the responding node can also transmit a completion notification to the home node in order to indicate that the snoop request has been fulfilled by the forwarding action performed by the responding node. As a consequence of this, the home node has no need to continue to issue snoop requests, and may avoid the need to access a main system memory in order to retrieve the data originally requested by the requesting node.

In some embodiments, said snoop request comprises an indication of said requesting node. By including an indication of the requesting node in the snoop request, the responding node is able to determine which of the various nodes within the system originally requested the data. This makes it possible for the responding node to directly transmit the response to the snoop request to the relevant requesting node within necessitating any intermediate node. The proposed scheme permits the interconnect (e.g. home node) to use its own identifiers different from the ones sent from the requesting node 120, to communicate with the snoop target (e.g. responding node 130). For forwarding to work, the home node, in addition to its own generated identifiers, must also include identifiers generated by the requesting node 120.

In some embodiments, said snoop request is received from a home node; said snoop request comprises a transaction identifier to identify a transaction from said requesting node to said home node that caused said snoop request to be generated; and said response comprises said transaction identifier. By including the transaction identifier provided in the snoop request, which in turn contains the transaction identifier from the original request made by the requesting node to the home node, it is possible for the response produced by the responding node to be associated with the original data request. In this way, it is possible for the requesting node to determine the relationship between the returned data and any requested data.

In some embodiments, said cache circuitry comprises a cache state associated with each of said at least one data value; and said cache state indicates that data value is at least one of: invalid, shared, owned, exclusive, and modified. The various cache states are provided in order to enable coherency between various nodes of an interconnected system. For example, each of the entries within the cache is provided with a state which can be used to indicate a degree of sharing and/or modification of the data throughout the system. For example the state "invalid" can be used to indicate that the cache line is no longer invalid and can be freely overwritten. The cache state "shared" can indicate that the data value is being shared between a number of different nodes, but is not modifiable. The state "owned" can indicate that the relevant cache line is modified in the local cache. This modified data might be shared with other nodes in the system, if the data has not been updated in the memory. The state "exclusive" can refer to the fact that the node is the only node in the system that has a copy of the line, but that the line has not been modified. Finally, the state "modified" can indicate that the node has the only copy of the cache line in the system and has made changes to that copy as compared to a main memory in the system. It will be appreciated that the states given here are merely examples of the distribution of permissions that the current embodiments are capable of working with. In other embodiments, the same distribution of permissions may be provided by using different cache state names and/or flags. For example, the AMBA specification produced by ARM Limited, Cambridge, United Kingdom describes different categories such as "invalid", "clean/dirty", and "unique/shared". These last two options may be combined in any combination in order to provide a total of five different states. Throughout the rest of this description, the AMBA cache states will be used. However, one of ordinary skill in the art will appreciate that alternative/equivalent cache states can also be used.

In some embodiments, said snoop request indicates whether forwarding is to occur, independently of state stored in association with said requested data at said data processing apparatus. By indicating whether the forwarding action performed by the responding node is to occur and by doing so independently of state stored in association with the requested data, it is possible to perform the forwarding operation without necessitating additional storage requirements. In particular, in some embodiments, said snoop request indicates whether forwarding is to occur independently of cache state stored in association with said requested data in said cache circuitry. In these embodiments, there is no need for the addition of a further cache state in order to indicate that forwarding is permissible or has occurred. Consequently, the forwarding operation performed by the responding node is independent of any cache state.

In some embodiments, said snoop request indicates whether forwarding is to occur by encoding a type of said snoop request. Consequently, it is as a result of the type or types of snoop request that are received by the responding node, that indicate that forwarding is to occur if the data is present at the responding node.

In other embodiments, said snoop request indicates whether forwarding is to occur, by a bit in said snoop request. By using a bit to indicate, in the snoop request, whether forwarding is to occur if the requested data is available at the responding node, an efficient encoding can be provided such that forwarding is enabled without a significant increase in traffic across the system. This can be important in a system comprising a number of nodes or where a large amount of data is frequently transferred.

In some embodiments, said snoop request is received from a home node; and when said transmitting circuitry is unable to transmit said response to said requesting node, said transmitting circuitry transmits said response to said home node. By informing the home node that the responding node is unable to transmit a response to the snoop request to the requesting node, the home node may be able to take additional action in order to provide the requested data to the requesting node. For example, this could be achieved by sending additional snoop request to other nodes within the system, or by sending a request to main memory for the data. In some other embodiments, a time out is provided such that the home node will conclude that the snoop request has failed unless the home node is notified to be contrary. In such embodiments however, it is necessary to wait the minimum period of time (i.e. the timeout time) before any conclusion can be reached regarding the success of the snoop request.

In some embodiments, when forwarding is to occur and said cache circuitry lacks said requested data, said transmitting circuitry transmits said response to said requesting node to indicate that said requested data is absent. Again, by providing an indicator to the home node that the responding node is unable to respond to the snoop request by providing the requested data to the requesting node, the home node is able to take some alternative action such as forwarding additional snoop requests or by issuing a request to main memory for the data to be provided.

In some embodiments, in addition to transmitting said response comprising said requested data to said requesting node, a cache state associated with said requested data in said cache circuitry is adjusted in dependence on at least one of said cache state and a type of said snoop request. In some cases, the snoop request may cause a change in the cache state associated with the requested data that is stored in the cache circuitry of the responding node. In particular, the change in cache data may be dependent on either or both of the original cache state associated with the data before the snoop request is received, and a type of the incoming snoop request. Each of these factors may be considered in order to determine a new cache state to be associated with the requested data in the cache circuitry when a response to the snoop request is transmitted.

In some embodiments, said type of said snoop request indicates a desired cache state for said requesting node to cache said requested data. The snoop request can therefore contain an indication of the desired degree or sharing and modification for the incoming data. In particular, the requesting node may desire a particular piece of data to be uniquely held by the requesting node, or the requesting node may be satisfied with the data being held in a shared state. In either case, the desired cache state could be factor in determining how the cache state associated with the requesting data in the cache circuitry of the responding node is modified.

In some embodiments, said response indicates a required cache state for said requesting node to cache said requested data. The response provided to the snoop request can indicate the cache state that is to be used for the requested data when provided back to the requesting node. Such a required cache state may be determined on the basis of the original cache state associated with the data at the requesting node, the new cache state associated with the data at the requesting node, and any requested cache state provided by the requesting node.

In some embodiments, said required cache state is shared. In other words, as a consequence of the forwarding, the data provided by the responding node is to be held by the requesting node in a shared state. Consequently, the data may be read by the requesting node, but may not be modified by that node.

In some embodiments, said snoop request is received from a home node; when said requested data indicates a cache state of modified in said cache circuitry, said required cache state is clean and said transmitting circuitry transmits a further response to said home node; and said further response comprises said requested data and indicates that said requested data is modified. One efficient way for the responding node to handle the situation where it receives a snoop request in respect of data that indicates a cache state of "modified", is for the responding node to respond to the snoop request using the previously mentioned forwarding process such that the data is forwarded to the requesting node. This can be transmitted with a required cache state of "clean" such that the requesting node is unaware of the data having been modified. At a similar time, the responding node can also issue a further response to the home node in order to provide the requested data and also indicate that the requested data has been modified. Typically, this will result in the home node making efforts to write back the modified data, for example to main system memory. This can therefore be achieved without having to either involve the requesting node, or having to write the data back to main system memory before it can be provided to the requesting node. As a consequence, latency of the overall requesting operation can be improved.

In accordance with another example configuration there is provided receiving circuitry to receive a data request from a requesting node in respect of requested data; and transmitting circuitry to transmit a snoop request to an other node, wherein said snoop request comprises an identifier of said requesting node, a reference to said requested data, and an indication of whether forwarding is to occur directly from said other node to said requesting node when said requested data is cached at said other node.

When a home node receives a request from a requesting node for data, the home node issues a snoop request to one or more other nodes within the system. The snoop request that is sent includes an indication of whether forwarding is to occur. As a consequence of this, the receiver of the snoop request can directly respond to the snoop request by sending the requested data, if it is present, to the requesting node, rather than sending the data back to the home node for transmission to the requesting node.

Particular embodiments will now be described with reference to the figures.

Figure 1:
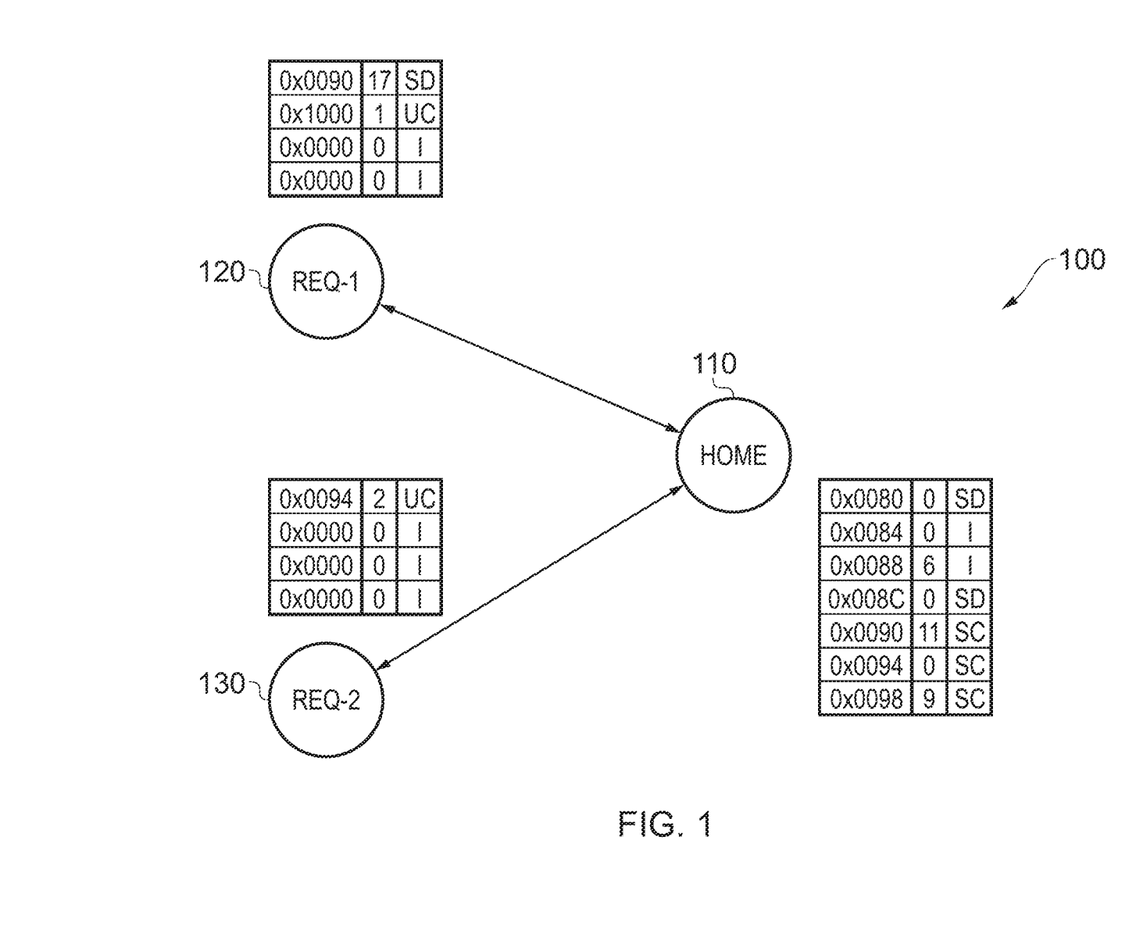
FIG. 1 illustrates a system comprising a data processing apparatus in accordance with one embodiment.

FIG. 1 illustrates a data processing system 100. Within the data processing system 100 is a home node 110 a first requesting node 120, and a second requesting node 130. The first requesting node 120 and the second requesting node 130 may be master nodes within an interconnect. In this embodiment, the first requesting node 120 will be referred to as the requesting node whereas the second requesting node 130 will be referred to as the responding node. Each of the nodes 110, 120, 130 in the data processing system 100 comprises a cache. Each cache is shown to have three columns. The first column represents an address of a data value, the second column represents the data value itself, and the third column represents a cache state associated with that data value. In this embodiment, the cache states correspond with those used in the AMBA specification produced by ARM Limited, Cambridge, UK Such cache states include "I" indicating that the particular entry is invalid and can be overwritten, "SD" indicating that the particular entry is both shared and dirty (i.e. in the more generic terminology the particular entry is "owned" by that node such that the entry is shared by other nodes but has been locally modified), "SC" indicating that the entry is shared and clean (i.e. in the more generic terminology the particular entry is "shared" such that the entry is shared by other nodes in the system and is unmodifiable), and "UC" indicating that the entry is unique and clean (i.e. in the more generic terminology the particular entry is "exclusive" such that the entry is uniquely owned by the node and has not been modified).

As is illustrated in the embodiment of FIG. 1, one or more of the nodes 120, 130 could have access to a data value that the other does not have access to. For example, the requesting node 120 does not have access to the data value 0x0094, which is held by the responding node 130. Similarly, the responding node 130 does not have access to the data value 0x0090, which is held by the requesting node 120. Consequently, the requesting node 120 wishes to access the data value 0x0094, it must send a request to the home node 110, which maintains coherency throughout the data processing system 100 in order to obtain access to that data value.

Although not shown in FIG. 1, the data processing system 100 could also comprise a main system memory, connected via the home node 110. Data can be retrieved from the main system memory on request from the home node 110. However, this process can be time consuming since accessing the main system memory will generally be slower than accessing one of the caches.

Figure 2:
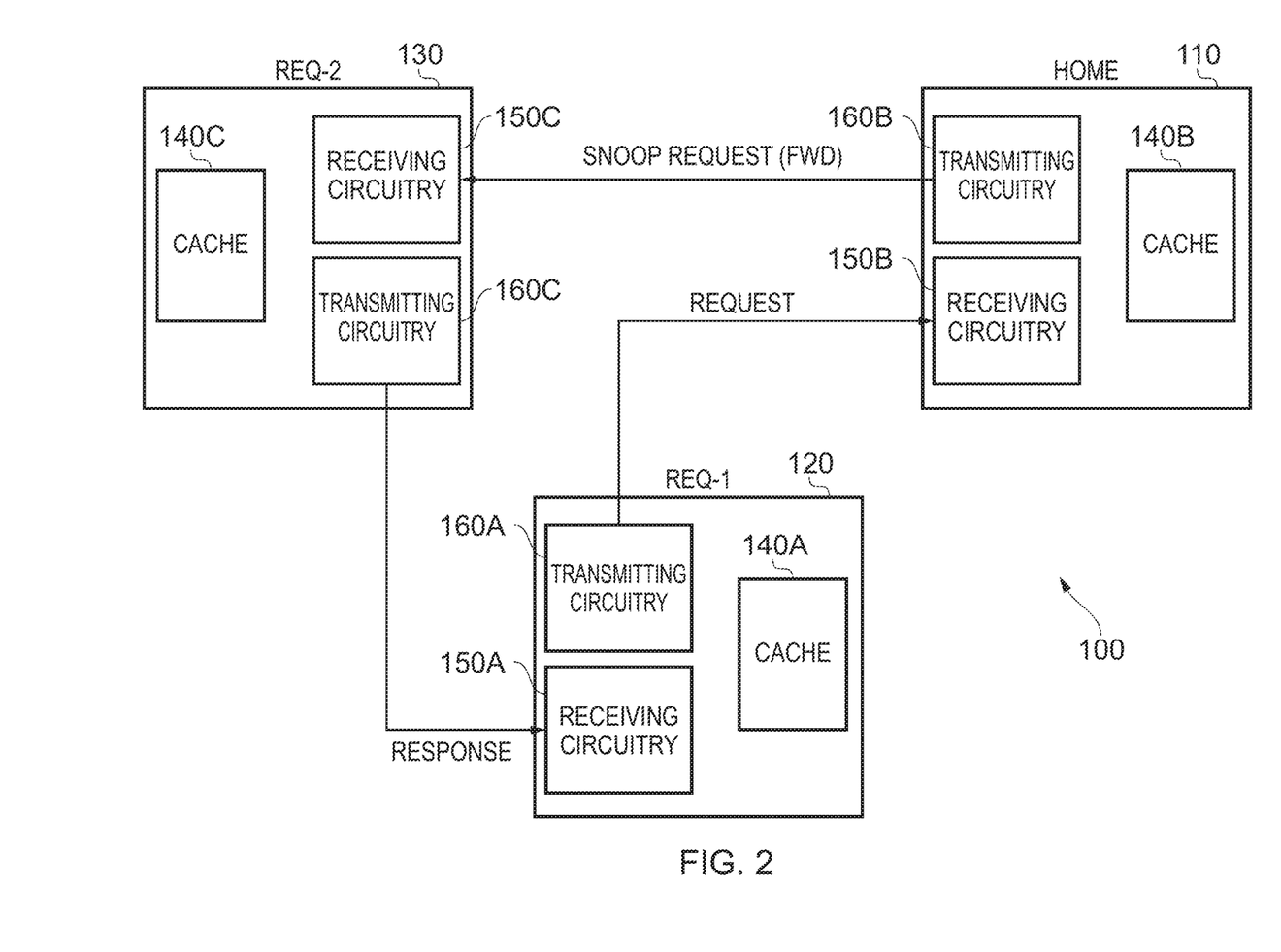
FIG. 2 illustrates a home node and two requester nodes in accordance with one embodiment.

FIG. 2 schematically illustrates the data processing system 100. Within the data processing system 100 are the home node 110, the first requesting node 120, and the second requesting node/responding node 130. Each of these nodes includes a cache 140A, 140B, 140C; receiving circuitry 150A, 150B, 150C; and transmitting circuitry 160A, 160B, 160C.

As previously mentioned, the requesting node 120 issues a request message to the home node 110 in respect of some desired data that is not found in the local cache 140A of the requesting node 120. This request message is transmitted by the transmitting circuitry 160A of the requesting mode 120, and is received by the receiving circuitry 150B of the home node 110. At this point, the home node 110 determines where the latest version of the requested data can be found. It determines that the latest version of this data can be found at the responding node 130. Accordingly, it issues a snoop forward request message to the responding node 130 for the data to be provided. This is transmitted by the transmitting circuitry 160B of the home node 110 and is received by the receiving circuitry 150C of the responding node 130. The details of the snoop forward request will be discussed in more detail with reference to FIG. 3. On receiving the snoop forward request, the responding node 130 searches its local cache 140C for the requested data. If found, then the requesting node 130 will attempt to directly forward this data in the form of a response to the first requesting node 120 as a consequence of the forwarding indication that indicates forwarding is to be performed. This response is transmitted by the transmitting circuitry 160C of the responding node 130 and is received by the receiving circuitry 150A of the requesting node 120.

Accordingly, the requested data from the requesting node 120 can be directly provided by the responding node 130. In particular, in this embodiment, there is no need for the response or the requested data to be provided back to the home node 110 and for the home node 110 to subsequently return the data back to the first requesting node 120. In this way, latency can be improved as a consequence of only one response message being required rather than two response messages being required.

Figure 3:
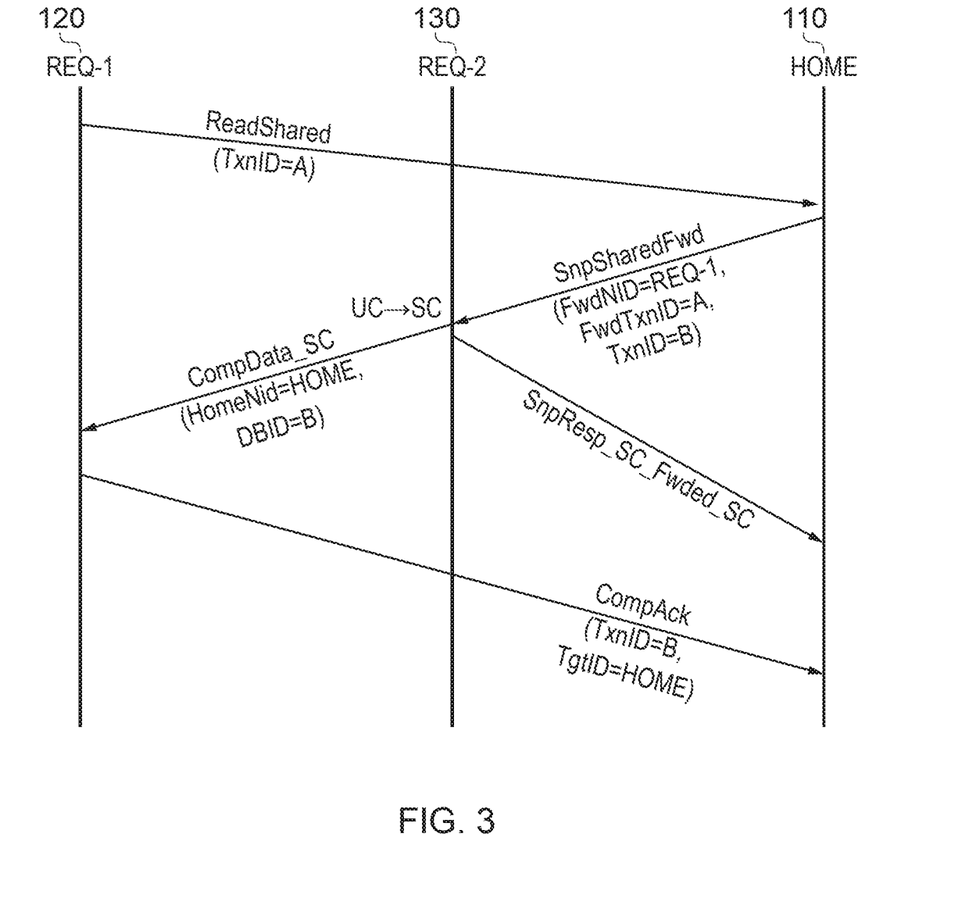
FIG. 3 shows a series of transactions between a home node and two requester nodes in accordance with one embodiment.

FIG. 3 illustrates a transaction sequence between the three nodes of the data processing system 100. The X axis represents each of the nodes and the Y axis represents time. Initially, the requesting node 120 issues a ReadShared message to the home node 110. This indicates that the requesting node 120 desires shared read access to a particular data value. When this is received by the home node 110 the home node 110 issues a SnpSharedFwd message to the responding node 130. This message is a snoop forward request message, indicating firstly that the requesting node 120 desires shared access to the particular data value and secondly that forwarding is to be carried out by the responding node 130. The message includes a forwarding node id to indicate the node from which the initial request originated (requesting node 120). The message also includes a transaction id associated with the initial requesting message issued by the requesting node 120. In particular, the initial ReadShared message issued by the requesting node 120 is associated with a particular transaction id (A). This transaction id is included as a second parameter of the snoop request forward message. Finally, the snoop request forward message also includes its own transaction id, B. When received at the responding node 130, the responding node 130 determines whether the requested data is present. In this embodiment, it is assumed that the data value is present. Since the requesting node 120 desires shared read access to the data value, the cache state associated with the data value is changed from unique clean (UC) to shared clean (SC). In addition, the responding node 130 issues a SnpResp_SC_Fwded_SC message back to the home node 110. The first SC indicates that the responding node 130 has kept a copy as SC and the second SC indicates that an SC copy has been sent to the requesting node 120. This message indicates that the snoop request has or will be responded to and that it was both requested and provided in a shared clean (SC) cache state. Similarly, the responding node 130 issues a response to the snoop request. In this embodiment, the response is sent in the form of a CompData_SC message sent from the responding node 130 to the requesting node 120. The responding node 130 is aware of the identity of the id of the requesting node 120 by virtue of the SnpSharedFwd message received from the home node 110, which identifies the requesting node 120. This response message includes as parameters, the identifier of the home node 110 and the transaction id of the snoop request being responded to (B).

Accordingly, when the requesting node 120 receives this response, the requesting node 120 has successfully obtained the data value. The requesting node 120 then responds with an acknowledgement to the home node 110. This acknowledgement includes as parameters a transaction id of the snoop request issued by the home node 110 (B) and the identifier of the home node 110. Once the home node receives this acknowledgement, it knows that the data has been successfully acquired by the requesting node 120 and that further action need not be taken to acquire the request data. If this acknowledgement or the snoop response issued by the responding node 130 is not received by the home node 110, then the home node 110 may conclude that the requested data has not been obtained by the requesting node 120 and further action may be taken. In particular, the home node 110 may query other nodes in the network using additional snoop requests, or may access a main system memory in order to acquire the data being requested.

In order to maintain coherency, a number of rules are provided regarding how the responding node must respond to different types of snoop request that are received. In particular, in dependence on the type of snoop request (which indicates the cache state that the requesting node would like to associate with the data once the data has been acquired) and a current cache state of the data as held by the responding node, a different action or series of actions may be taken. In particular, these actions may dictate a change in the cache state of the data held by the responding node. These rules are described below. Again, as already states, these rules are provided based on the AMBA specification produced by ARM Limited, Cambridge, United Kingdom. However, one of ordinary skill in the art will appreciate that an equivalent set of rules can be devised using other equivalent states.

The common rules for handling of a Forward type Snoop at the responding node 130 are:
  Forward a copy to the requesting node if the line is in UD (unique dirty), UC (unique clean), SD (shared dirty), or SC (shared clean) state.
  Not permitted to convert to a corresponding non-forwarding type snoop.
  Do not forward data in Unique state in response to a Non-Invalidating Snoop type.

Responding node 130 receiving a Snoop request with DoNotGoToSD bit set does not transition to SD (shared dirty) even if the coherency permits it.

SnpSharedFwd

The rules in addition to the common rules listed earlier to be followed by the responding node 130 that receives SnpSharedFwd are Responding node 130 is permitted to forward the line in either SD (shared dirty), UC (unique clean), UD (unique dirty) or SC (shared clean) state.

Responding node 130 transitions its copy of the data to either SD (shared dirty), SC (shared clean) or I (invalid) state.

SnpCleanFwd

The rules in addition to the common rules listed earlier to be followed by the responding node 130 that receives SnpCleanFwd are Responding node 130 forwards cache line in SC (shared clean) or UC (unique clean) state.

Responding node 130 transitions its copy of the data to either SD (shared dirty), SC (shared clean) or I (invalid) state.

SnpUniqueFwd

The rules in addition to the common rules listed earlier to be followed by the responding node 130 that receives SnpUniqueFwd are Responding node 130 forwards cache line in unique state.

Responding node 130 that has the data in any dirty state such as UD (unique dirty) or SD (shared dirty) passes the dirty data to the requester not to home.

Responding node 130 transitions its copy of the data to I (invalid) state.

Responding node 130 does not return data to the home node 110.

SnpNotSharedDirtyFwd

The rules in addition to the common rules listed earlier to be followed by responding node 130 that receives SnpNotSharedDirtyFwd are Responding node 130 forwards the data in SC (shared clean), UC (unique clean), and UD (unique dirty) state.

Responding node 130 transitions its copy of the data to SD, SC or I state.

SnpOnceFwd

The rules in addition to the common rules listed earlier to be followed by responding node 130 that receives SnpOnceFwd are Responding node 130 forwards the data in I (invalid) state.

As a consequence of the above the responding node 130 does not forward dirty data to the requesting node 120.

Responding node 130 returns data to the home node 110 when the data state is changed from UD (unique dirty) or SD (shared dirty) to UC (unique clean) or SC (shared clean).

Figure 4:
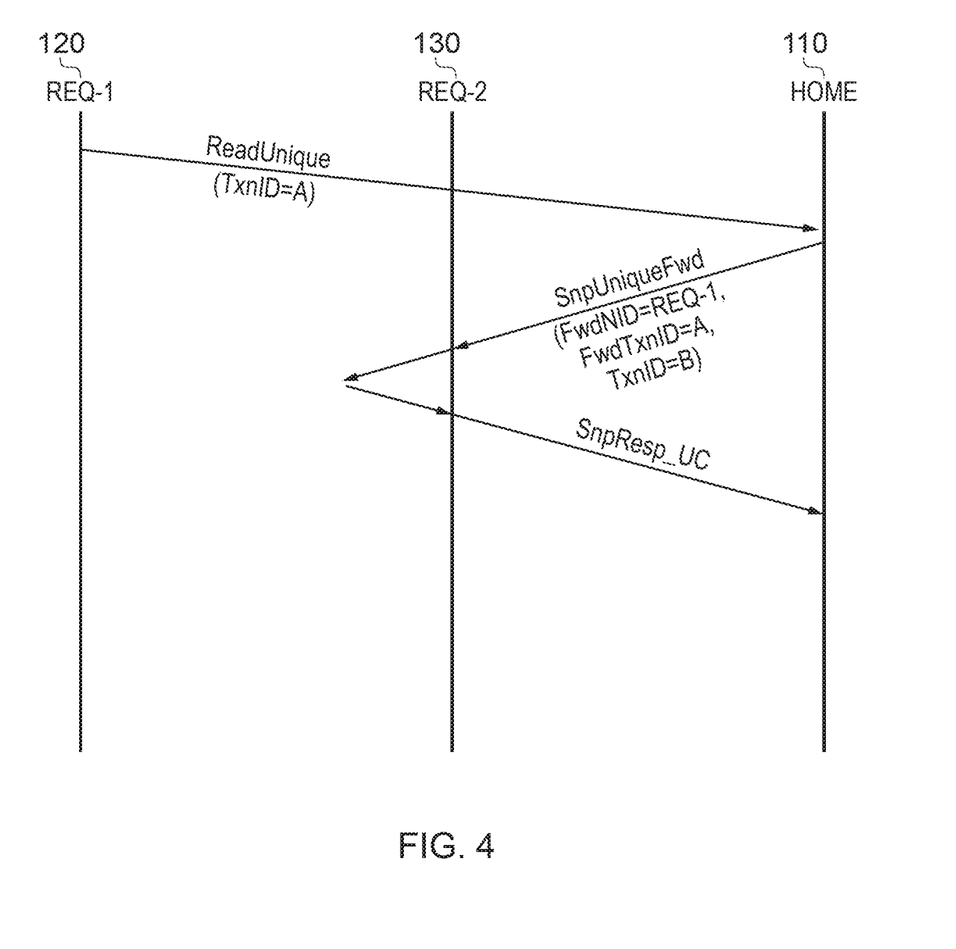
FIG. 4 shows a series of transactions between a home node and two requester nodes in accordance with one embodiment.

FIG. 4 illustrates a transaction diagram where the connection between the requesting node 120 and the responding node 130 is broken. In particular, the series of transactions proceeds in the same manner as before, with the requesting node 120 instead requesting a unique copy of the data. However, once the SnpUniqueFwd message is received by the responding node 130 and the responding node 130 attempts to forward the data to the requesting node 120, it is determined that the link between the requesting node 120 and the responding node 130 is broken. As a consequence, the responding node 130 instead responds to the home node 110 with a regular snoop response message containing the requested data. At this point, the home node 110 can forward the data to the requesting node 120 as per a typical snoop request/snoop response process.

Figure 5:
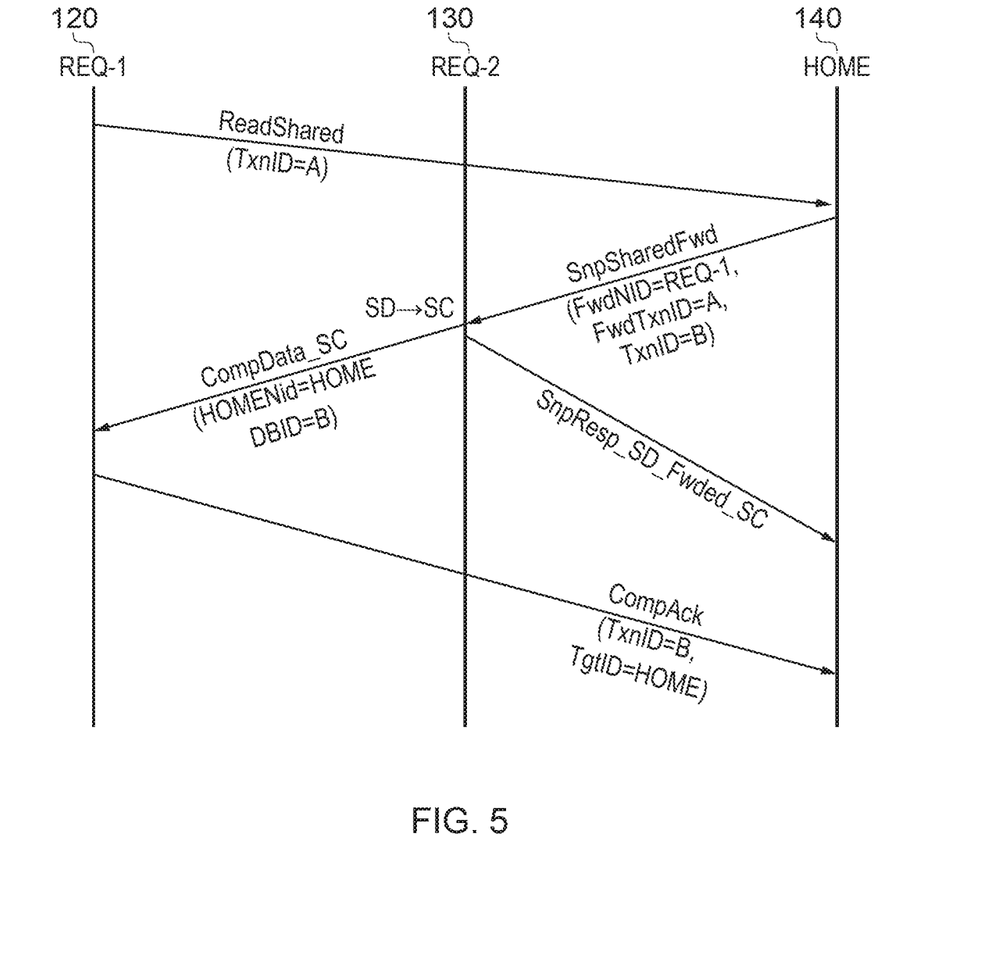
FIG. 5 shows a series of transactions between a home node and two requester nodes in accordance with one embodiment.

FIG. 5 illustrates a transaction diagram between the requesting node 120, the responding node 130, and the home node 140. The transactions proceed as per the embodiment shown in FIG. 3. However, on this occasion, the data stored by the responding node 130, which is requested by the requesting node 120, is dirty. In other words, the data has been modified in the local cache of the responding node 130. In this case, the data is still forwarded to the requesting node 120 by the responding node 130. Furthermore, the responding node 130 indicates to the requesting node 120 that the data is clean. In other words, the requesting node 120 is able to store the data in its cache with a cache state of shared clean (SC). However, when the responding node 130 issues a response back to the home node 140, this is done in the form of an SnpResp_SC_Fwded_SC message, enclosing the modified (dirty) data and indicating that the data was forwarded to the requesting node 120 in a shared clean state. In response to this, the home node 140 will cause the data to be written back, either to a system cache or to main memory. Accordingly, the requesting node 120 receives the up-to-date data quickly. This is achieved without necessitating the data being transmitted to the home node 140, written back, and then provided to the requesting node 120, which would incur a significant delay.

Figure 6:
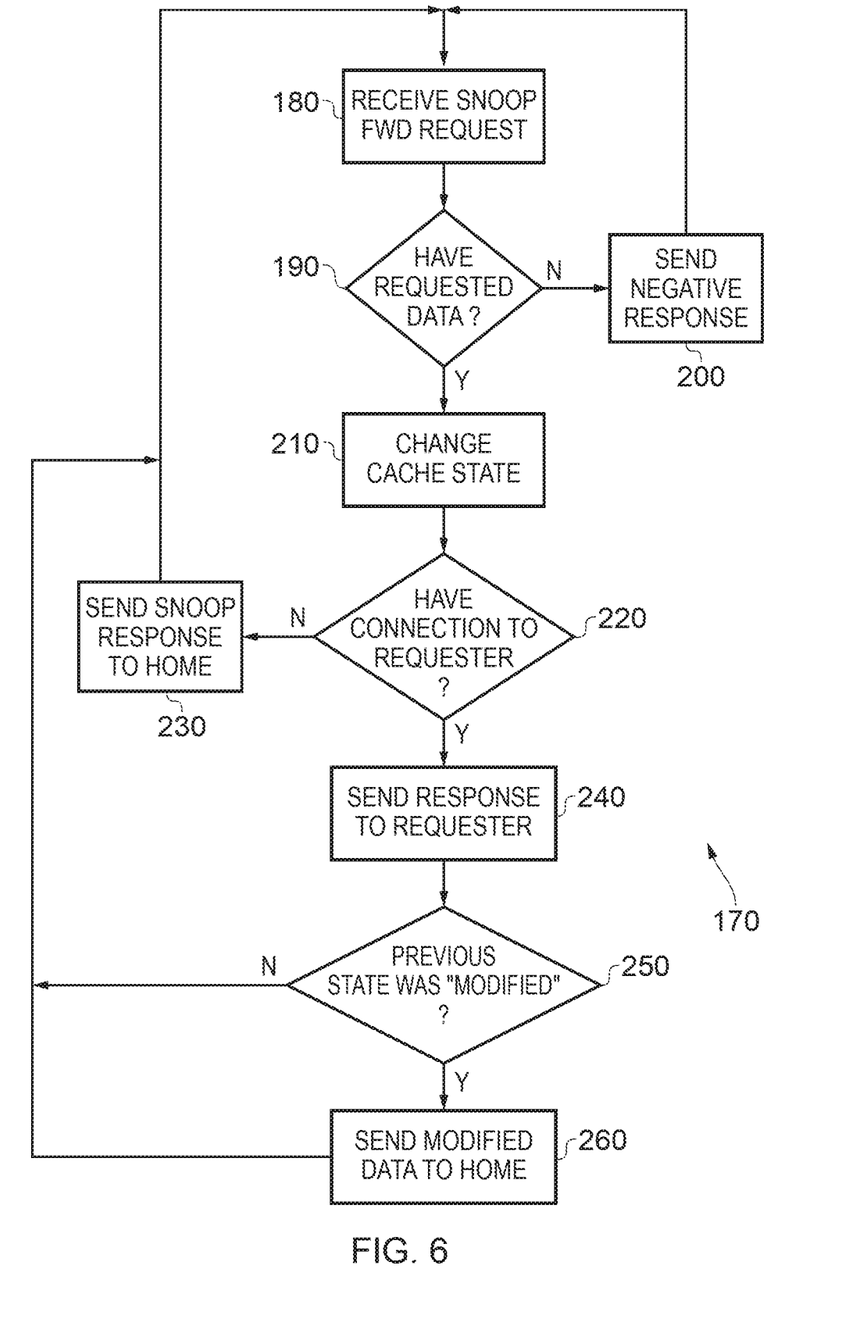
FIG. 6 illustrates, in flow chart form, a method of data processing by a requester node in accordance with one embodiment.

FIG. 6 is a flow chart 170 illustrating a method of data processing in accordance with one embodiment. The process begins at a step 180, where a snoop forward request is received. At step 190, it is determined whether the local node has the requested data in its local cache. If not, then at step 200 a negative response may be issued back to the home node and the process returns to step 180. Alternatively, at step 210, the cache state associated with the data in the local cache is modified in dependence on the type of snoop request that has been issued and the current cache state of the data in the local cache. Once this is done, if appropriate, then at step 220, it is determined whether the node has a connection to the requester or not. If not, then at step 230 a snoop response is transmitted back to the home node, and the process returns to step 180. If the node does have a connection to the requester, then at step 240, a response is transmitted to the requester. The process then proceeds to step 250, where it is determined whether the previous cache state associated with the data was "modified". For example, this may equate with a shared dirty state meaning that the local node had modified the data. If not, then the process returns to step 180. Otherwise, at step 260, the modified data is sent back to the home node. The process then returns to step 180.

Accordingly, the described embodiments make it possible to quickly respond to a snoop request directly. Furthermore, this can be achieved without any extension of cache state in any of the provided systems.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
receiving circuitry to receive a snoop request in respect of requested data on behalf of a requesting node, said snoop request comprising a specification as to whether forwarding is to occur;
transmitting circuitry to transmit a response to said snoop request; and
cache circuitry to cache the requested data in association with a cache state of the requested data, wherein
when forwarding is to occur, said response comprises said requested data and said transmitting circuitry transmits said response to said requesting node;
said snoop request is received from a home node, different from said requesting node;
when forwarding is to occur, said transmitting circuitry additionally transmits a completion notification to said home node to indicate that said snoop request has been fulfilled; and
said forwarding occurs regardless of whether said cache state of said requested data is invalid, regardless of whether said cache state of said requested data is shared, regardless of whether said cache state of said requested data is owned, regardless of whether said cache state of said requested data is exclusive, and regardless of whether said cache state of said requested data is modified.

2. A data processing apparatus according to claim 1, wherein
when forwarding is inhibited from occurring, said response comprises said requested data and said transmitting circuitry transmits said response to said home node.

3. A data processing apparatus according to claim 1, wherein
said snoop request comprises an indication of said requesting node.

4. A data processing apparatus according to claim 1, wherein
said snoop request comprises a transaction identifier to identify a transaction from said requesting node to said home node that caused said snoop request to be generated; and said response comprises said transaction identifier.

5. A data processing apparatus according to claim 1, wherein
said snoop request specifies whether forwarding is to occur, independently of state stored in association with said requested data at said data processing apparatus.

6. A data processing apparatus according to claim 1, wherein
said snoop request specifies whether forwarding is to occur, by encoding a type of said snoop request.

7. A data processing apparatus according to claim 1, wherein
said snoop request specifies whether forwarding is to occur, by a bit in said snoop request.

8. A data processing apparatus according to claim 1, wherein
when said transmitting circuitry is unable to transmit said response to said requesting node, said transmitting circuitry transmits said response to said home node.

9. A data processing apparatus according to claim 1, wherein
when forwarding is to occur and said cache circuitry lacks said requested data, said transmitting circuitry transmits said response to said requesting node to indicate that said requested data is absent.

10. A data processing apparatus according to claim 1, wherein
in addition to transmitting said response comprising said requested data to said requesting node, a cache state associated with said requested data in said cache circuitry is adjusted in dependence on at least one of said cache state and a type of said snoop request.

11. A data processing apparatus according to claim 10, wherein
said type of said snoop request indicates a desired cache state for said requesting node to cache said requested data.

12. A data processing apparatus according to claim 1, wherein
said response indicates a required cache state for said requesting node to cache said requested data.

13. A data processing apparatus according to claim 12, wherein
said required cache state is shared.

14. A data processing apparatus according to claim 12, wherein
when said requested data indicates a cache state of modified in said cache circuitry, said required cache state is clean and said transmitting circuitry transmits a further response to said home node; and
said further response comprises said requested data and indicates that said requested data is modified.

15. A data processing method comprising:
caching one data value in association with a cache state of that data value;
receiving, from a home node, a snoop request in respect of said one data value on behalf of a requesting node different from said home node, said snoop request comprising a specification as to whether forwarding is to occur; and
transmitting a response to said snoop request, wherein
when forwarding is to occur and said one data value is present, said response comprises said one data value and said response is transmitted to said requesting node regardless of whether said cache state of said one data value is invalid, regardless of whether said cache state of said requested data is shared, regardless of whether said cache state of said requested data is owned, regardless of whether said cache state of said requested data is exclusive, and regardless of whether said cache state of said requested data is modified; and
when forwarding is to occur and said one data value comprises said requested data, a completion notification is transmitted to said home node to indicate that said snoop request has been fulfilled.

* * * * *